(12) United States Patent
Miyakawa et al.

(10) Patent No.: US 11,982,681 B2
(45) Date of Patent: May 14, 2024

(54) ELECTROLYTE ANALYZING DEVICE

(71) Applicant: Hitachi High-Tech Corporation, Tokyo (JP)

(72) Inventors: Takushi Miyakawa, Tokyo (JP); Masaki Hara, Tokyo (JP); Tetsuji Kawahara, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 869 days.

(21) Appl. No.: 17/045,606

(22) PCT Filed: Mar. 26, 2019

(86) PCT No.: PCT/JP2019/012767
§ 371 (c)(1),
(2) Date: Oct. 6, 2020

(87) PCT Pub. No.: WO2019/198493
PCT Pub. Date: Oct. 17, 2019

(65) Prior Publication Data
US 2021/0025909 A1    Jan. 28, 2021

(30) Foreign Application Priority Data
Apr. 12, 2018 (JP) ................................ 2018-076636

(51) Int. Cl.
*G01N 35/10* (2006.01)
(52) U.S. Cl.
CPC ..... *G01N 35/1002* (2013.01); *G01N 35/1011* (2013.01)
(58) Field of Classification Search
CPC .............. B26D 1/405; B26D 2007/202; B26D 2007/2685; B26D 7/20; B26D 7/2628;
(Continued)

(56) References Cited

U.S. PATENT DOCUMENTS 5,102,623 A    4/1992 Yamamoto et al.
5,288,374 A *  2/1994 Watanabe ............ G01N 33/492
                                                204/415
(Continued)

FOREIGN PATENT DOCUMENTS

JP    1-97865 A    4/1989
JP    9-211007 A   8/1997
(Continued)

OTHER PUBLICATIONS

JP H06-258330 A Sep. 1994 Japan Ineji English translation (Year: 1994).*

(Continued)

*Primary Examiner* — Jennifer Wecker
*Assistant Examiner* — Jonathan Bortoli
(74) *Attorney, Agent, or Firm* — Baker Botts L.L.P.

(57) ABSTRACT

Provided is an electrolyte analyzing device in which contamination caused by contacting different reagents with a suction nozzle is prevented when reagent replacement is performed by a user. The electrolyte analyzing device includes a reagent container setting unit 502 that sets a dilute solution bottle 101-1 which houses a dilute solution, an internal standard solution bottle 101-2 which houses an internal standard solution, and a reference electrode solution bottle 101-3 which houses a reference electrode solution. The reagent container setting unit includes a partition wall between the dilute solution bottle 101-1 and the internal standard solution bottle 101-2, and the reference electrode solution bottle 101-3 when the dilute solution bottle 101-1, the internal standard solution bottle 101-2, and the reference electrode solution bottle 101-3 are set.

13 Claims, 13 Drawing Sheets

(58) Field of Classification Search
CPC ............. Y10T 83/4827; Y10T 83/8776; Y10T 83/9394; G01N 2035/00277; G01N 35/1002; G01N 35/1011; A61K 8/49; A61K 8/4906; A61K 8/4926; A61Q 17/04; A61Q 19/08; B01D 2251/304; B01D 2251/604; B01D 2257/504; B01D 2258/0283; B01D 53/1418; B01D 53/343; B01D 53/62; B01D 53/96; C07D 211/16; C07D 223/04; C07D 265/30; C07D 401/10; F02C 6/00; H01M 8/143; H01M 8/2455; Y02C 20/40; Y02E 20/16; Y02E 60/50; Y02P 20/129; Y02P 20/141
See application file for complete search history.

(56) References Cited

U.S. PATENT DOCUMENTS

| | | | | |
|---|---|---|---|---|
| 5,525,298 | A * | 6/1996 | Takayuki | ........... G01N 35/1079 422/65 |
| 8,192,992 | B2 * | 6/2012 | Ammann | ................. B01L 7/52 422/68.1 |
| 2011/0244557 | A1 | 10/2011 | Hamada | |
| 2015/0273466 | A1 * | 10/2015 | Nagai | ..................... B01L 3/523 422/547 |
| 2018/0195986 | A1 | 7/2018 | Tajima | |
| 2019/0265187 | A1 | 8/2019 | Kishioka et al. | |

FOREIGN PATENT DOCUMENTS

| | | | |
|---|---|---|---|
| JP | 2000-275207 | A | 10/2000 |
| JP | 2004-163319 | A | 6/2004 |
| JP | 2011-099834 | A | 5/2011 |
| JP | 2011-209207 | A | 10/2011 |
| JP | 2015-175707 | A | 10/2015 |
| JP | 2015-190901 | A | 11/2015 |
| JP | 2018-017543 | A | 2/2018 |
| WO | WO 2017/010392 | A1 | 1/2017 |

OTHER PUBLICATIONS

Extended European Search Report, dated Dec. 20, 2021, for European Application No. 19784646.2.
International Search Report, dated Jun. 25, 2019, for International Application No. PCT/JP2019/012767.

* cited by examiner

[FIG. 1]
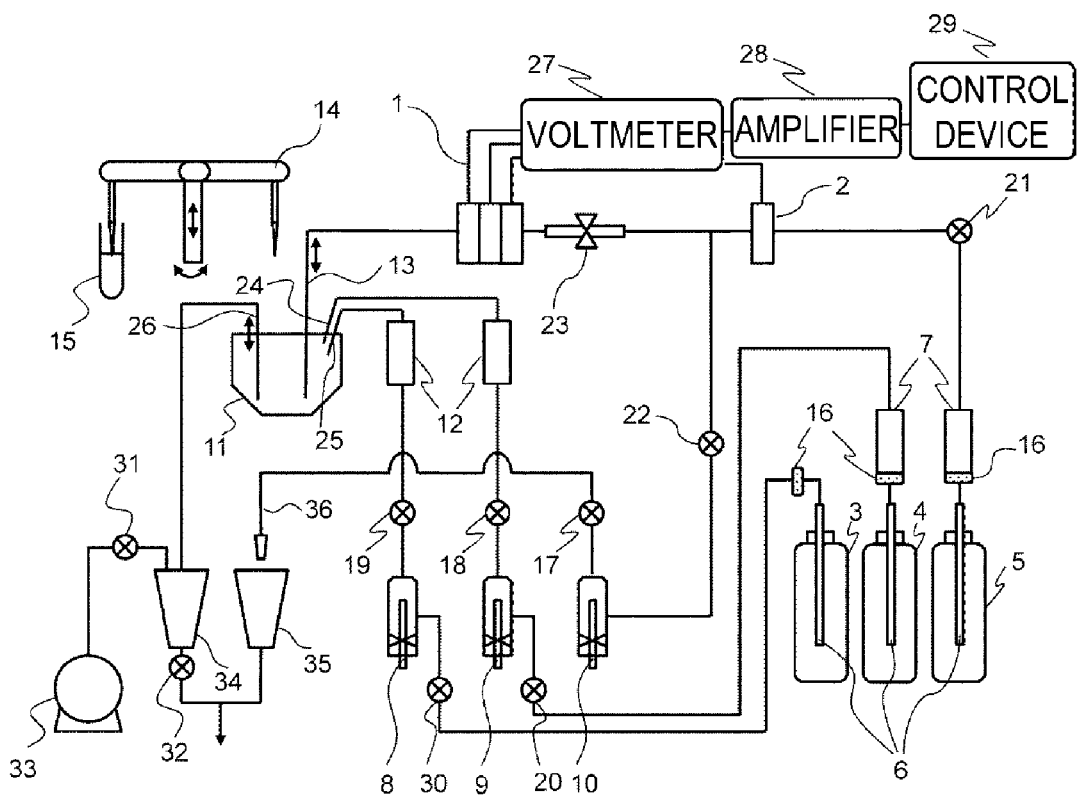

[FIG. 2]
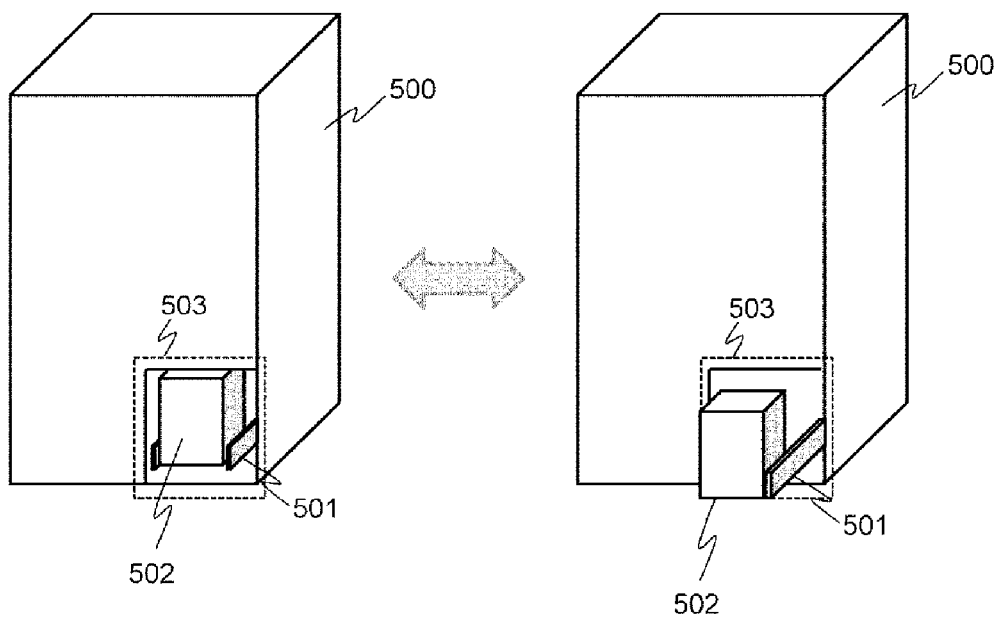

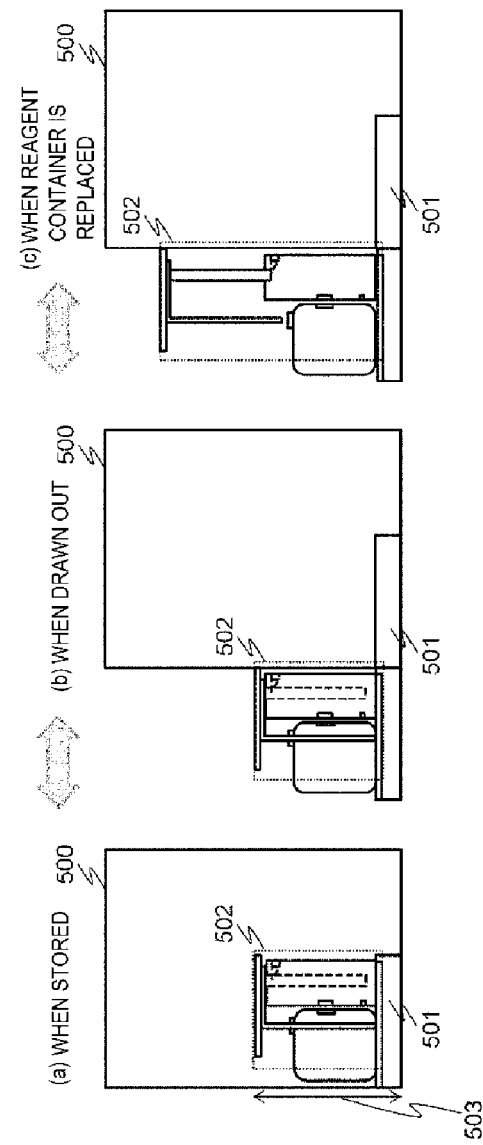
[FIG. 3]

[FIG. 4]
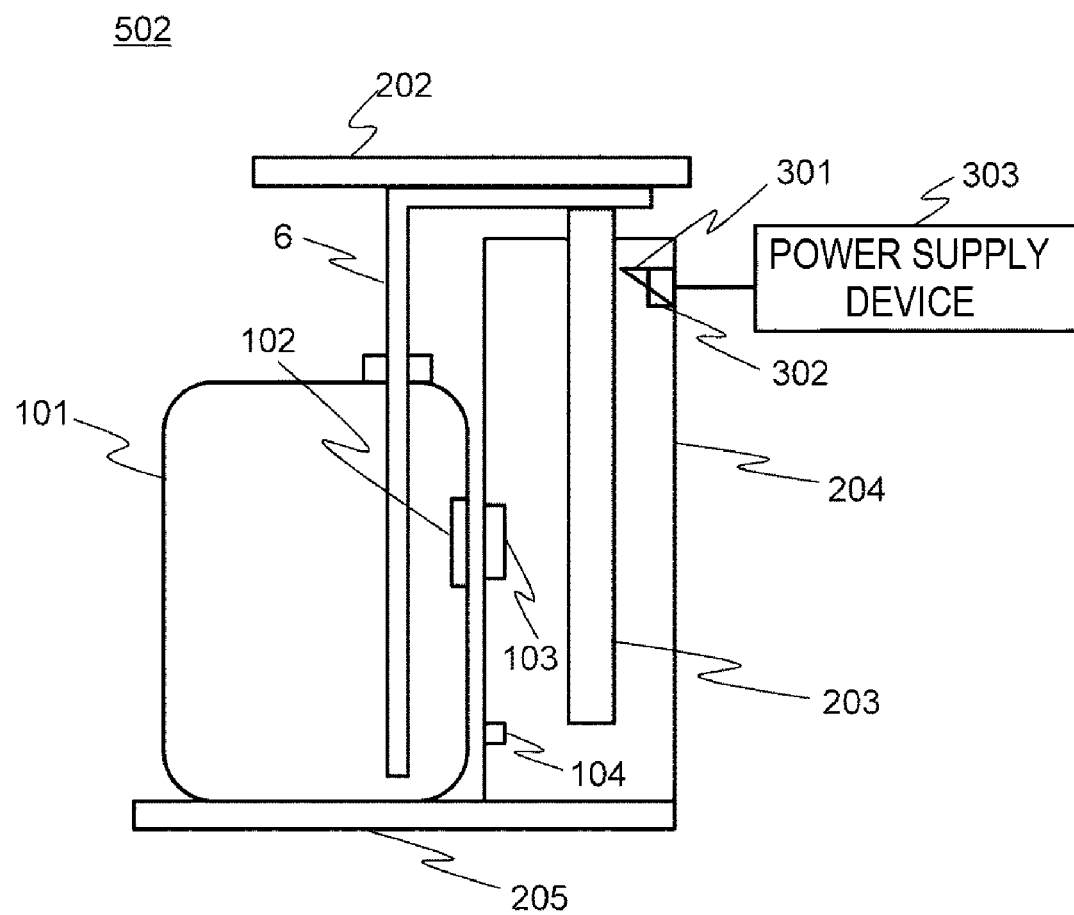

[FIG. 5A]
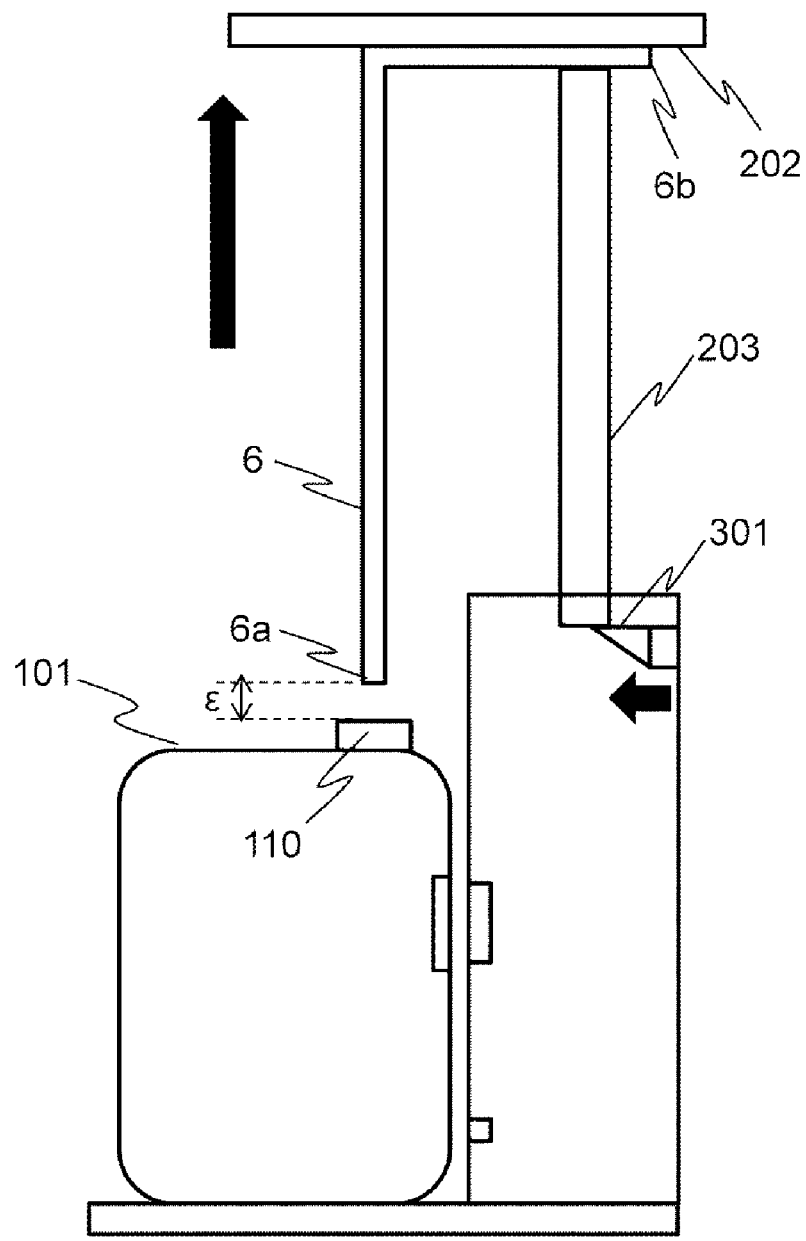

[FIG. 5B]
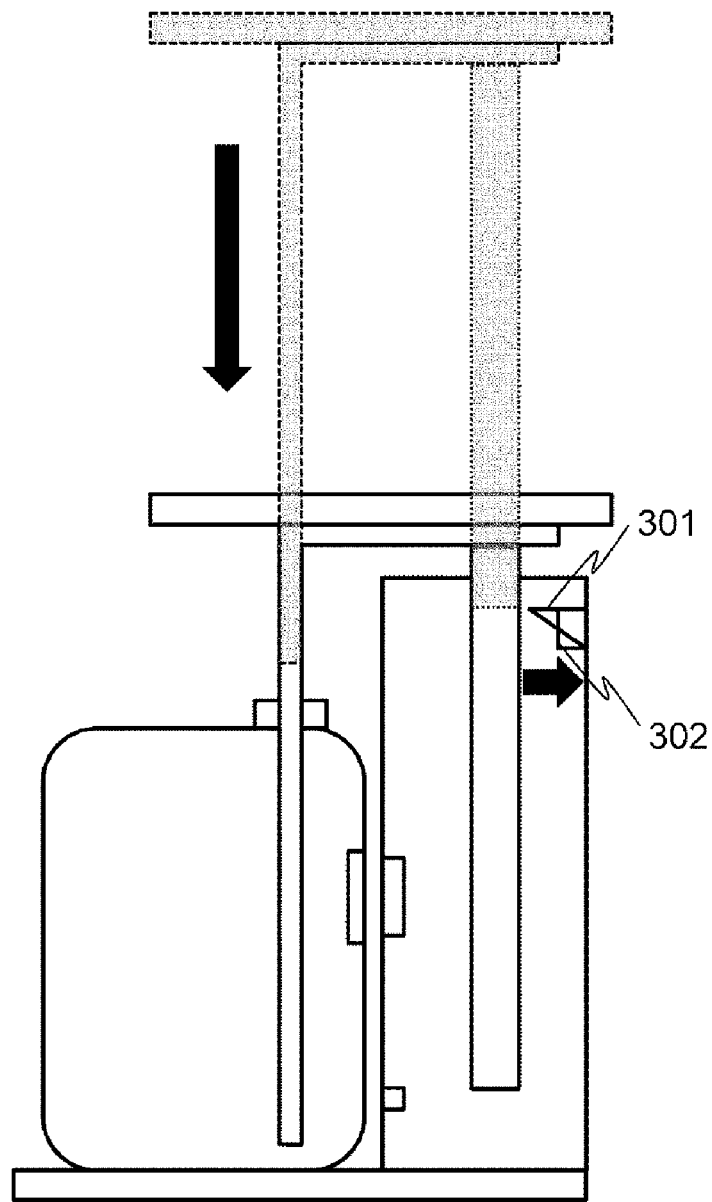

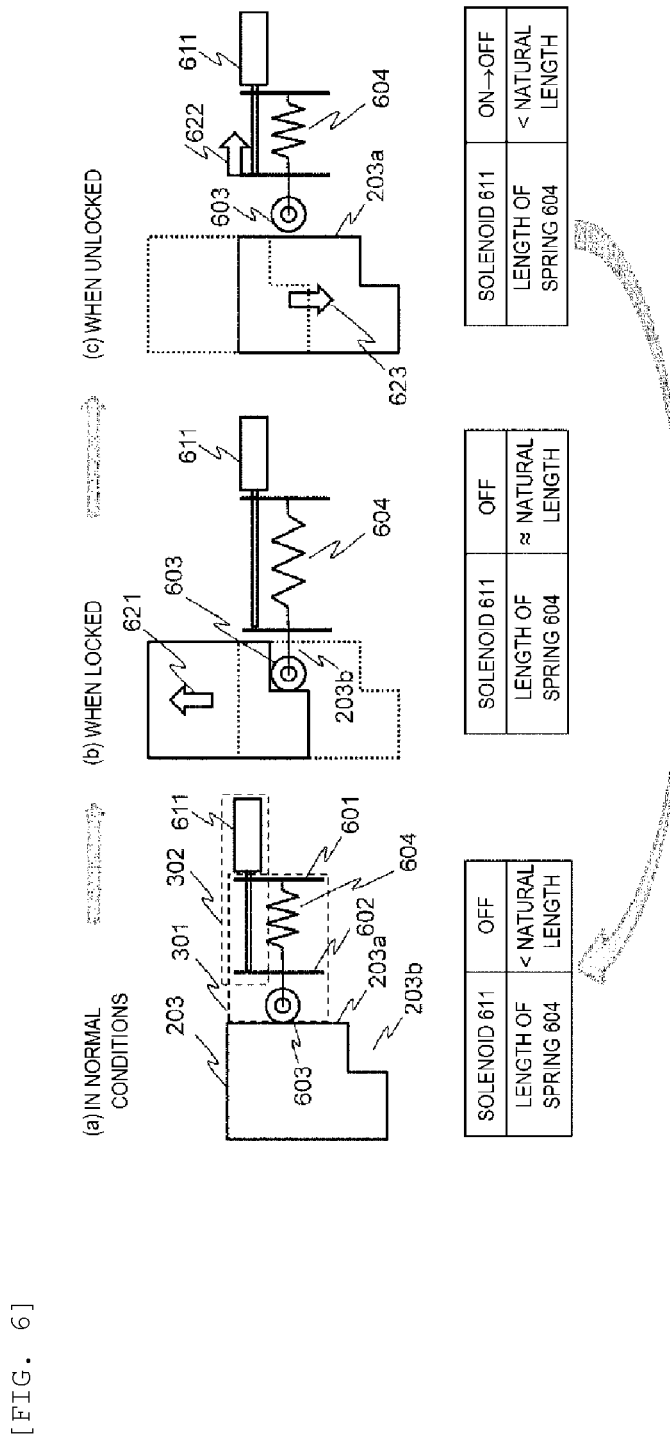
[FIG. 6]

[FIG. 7A]
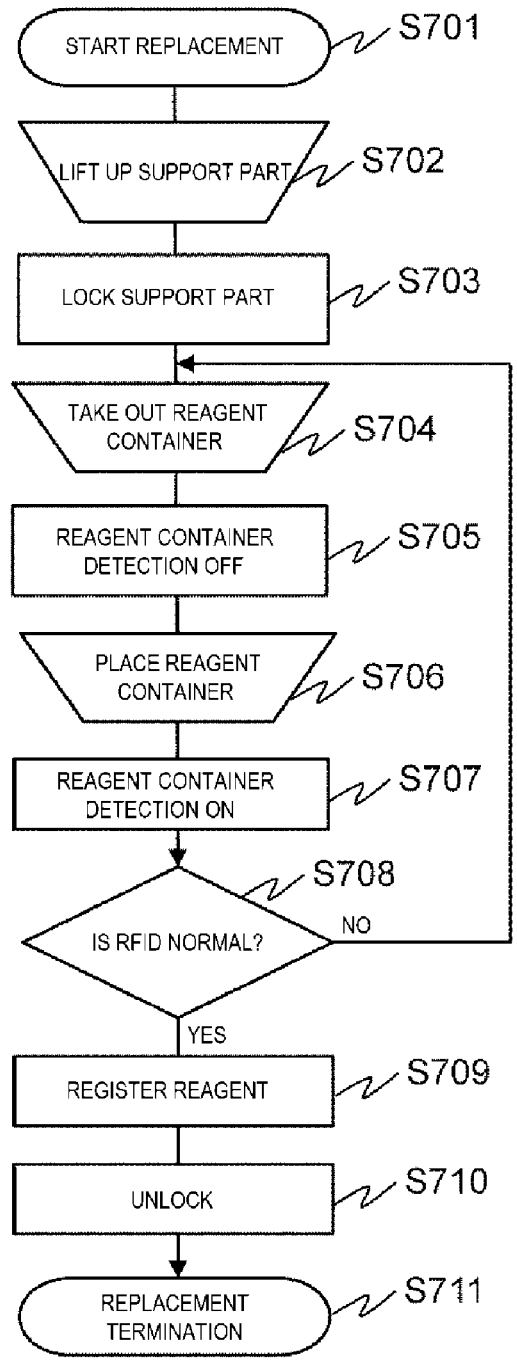

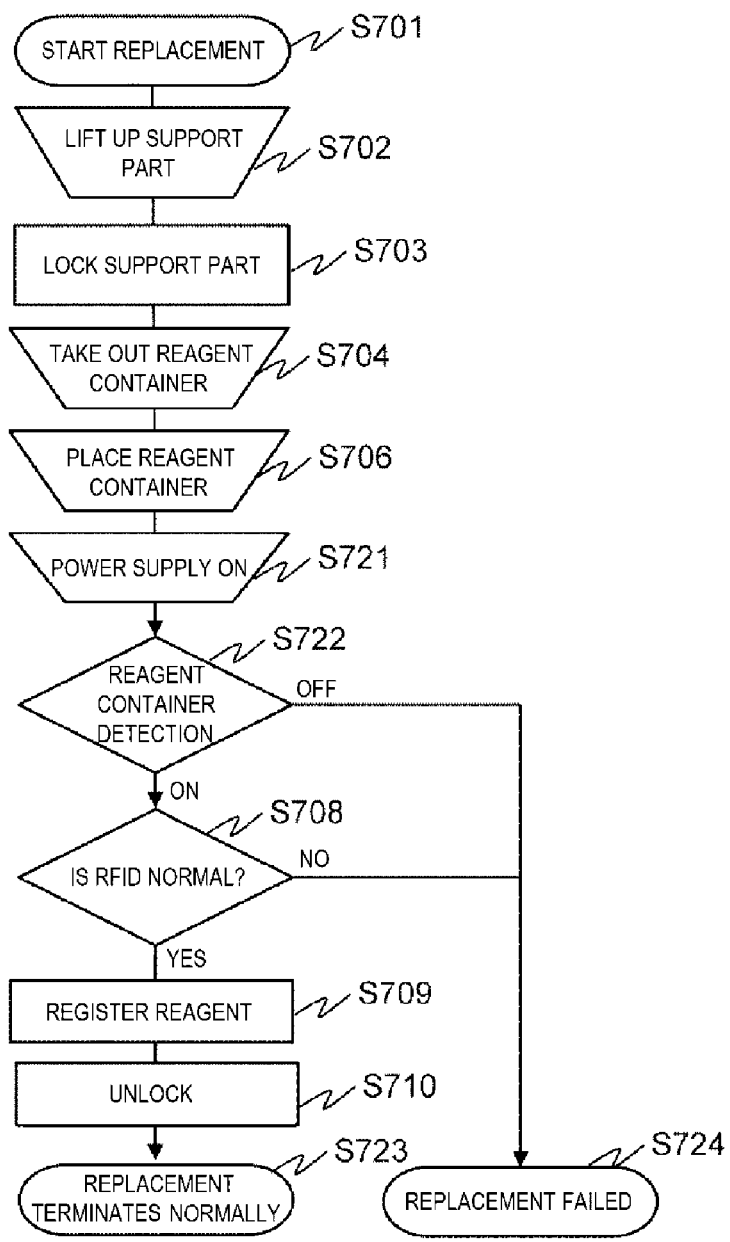

[FIG. 8]
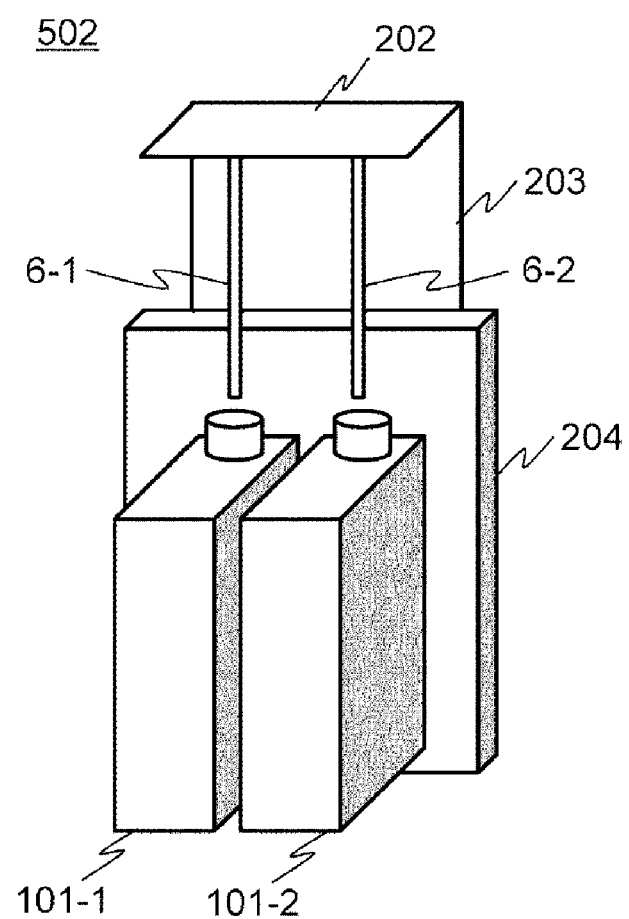

[FIG. 9A]
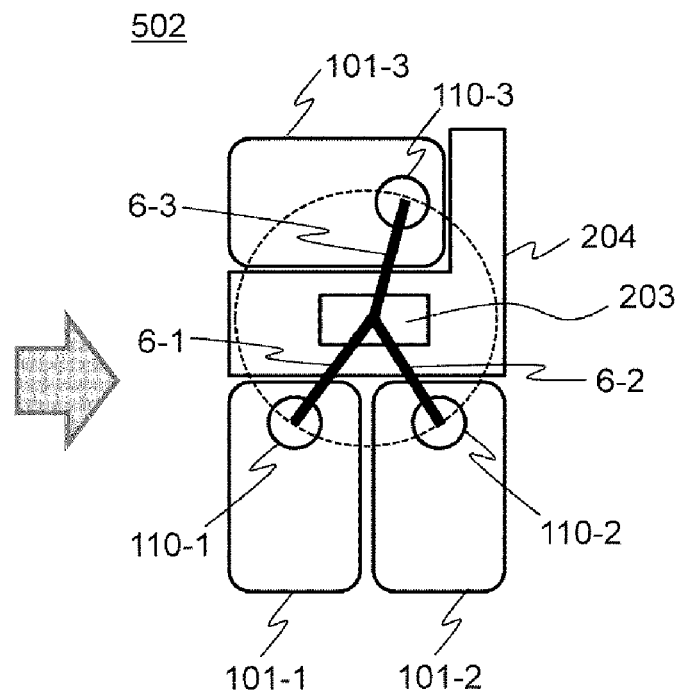
[FIG. 9B]
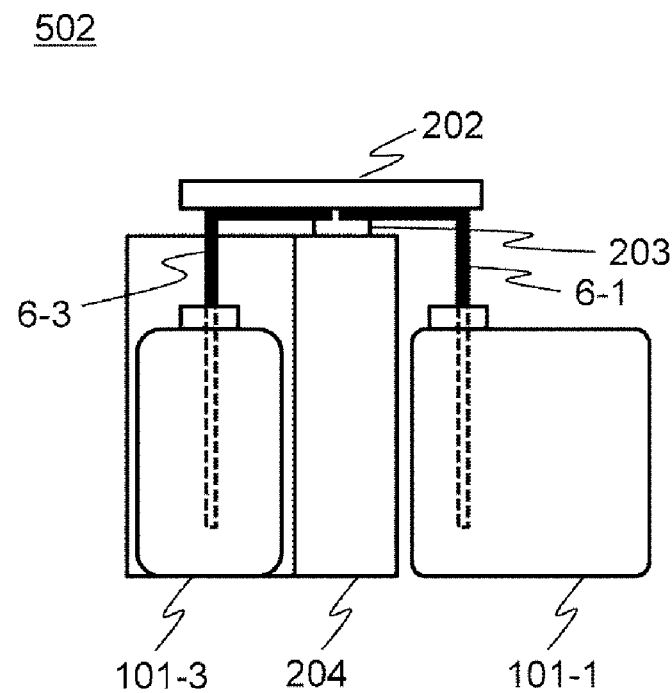

[FIG. 10]
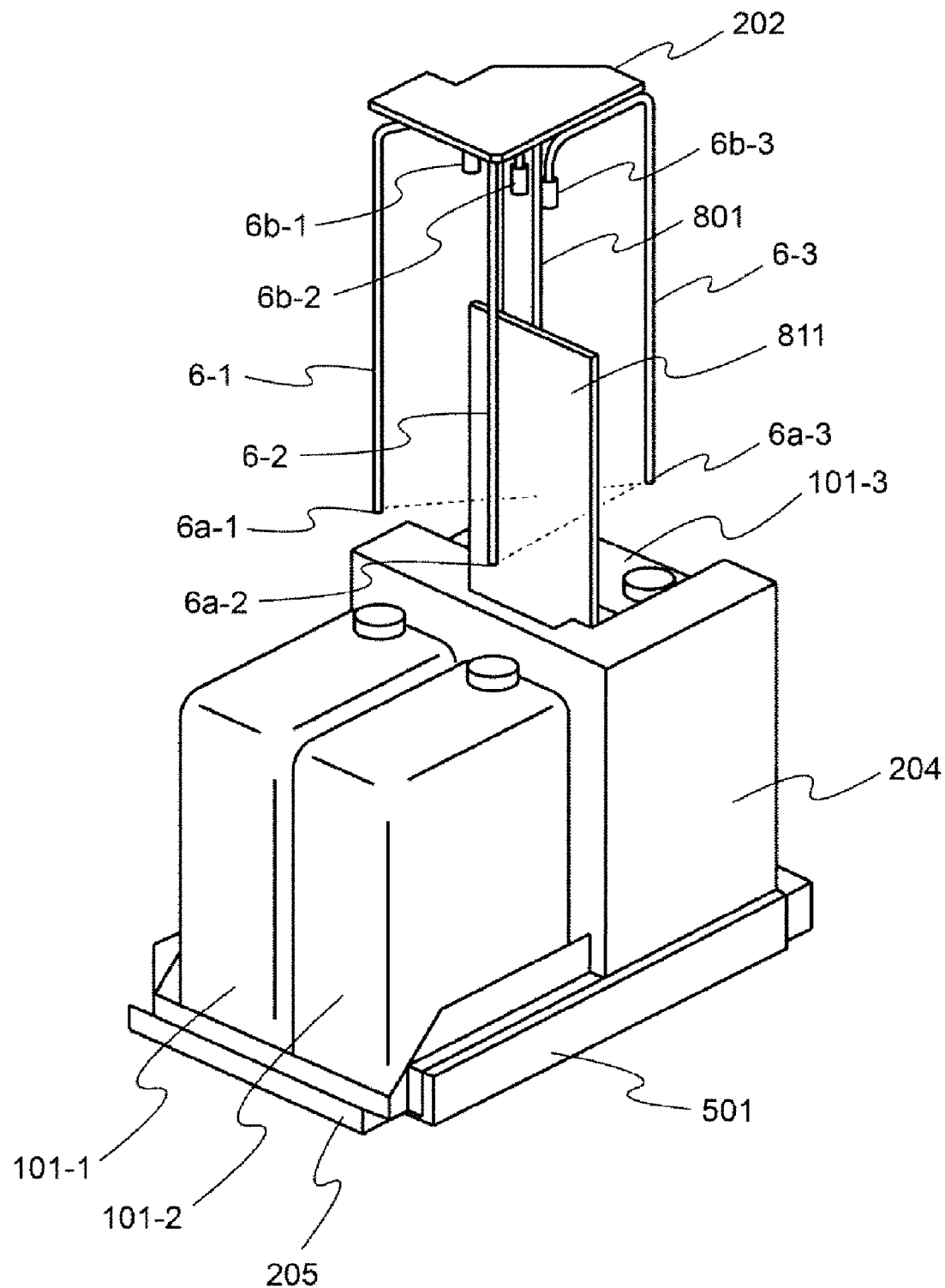

[FIG. 11]
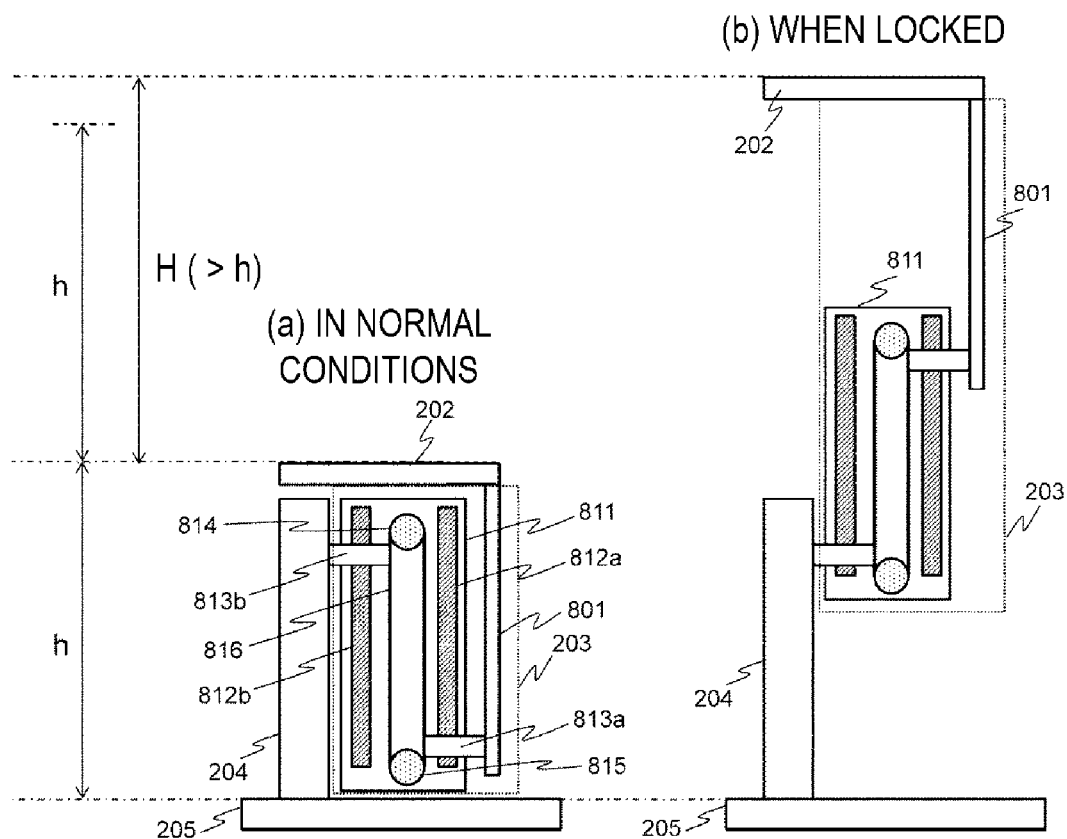

ELECTROLYTE ANALYZING DEVICE

TECHNICAL FIELD

The present invention relates to an electrolyte analyzing device.

BACKGROUND ART

An electrolyte analyzing device is a device for measuring a concentration of a specific electrolyte contained in an electrolyte solution such as human blood and urine, and uses an ion selective electrode to measure the concentration. As a general measurement method, serum which is an electrolyte solution is directly supplied to an ion selective electrode, or a sample solution obtained by diluting a sample with a dilute solution is supplied to the ion selective electrode to measure a liquid junction potential with a reference electrode solution. Next (or prior to the measurement), a standard solution is supplied to the ion selective electrode, a liquid junction potential between the reference electrode solution and the standard solution is measured in the same manner, and an electrolyte concentration of the sample solution is calculated based on two liquid junction potential levels.

In this way, in a flow-type electrolyte analyzing device, reagents such as the dilute solution, the standard solution, and the reference electrode solution are used as consumables, and replacement of these reagents is performed by a user. The flow-type electrolyte analyzing device often includes a dedicated suction nozzle for each of these reagents, and it is general that the dedicated suction nozzle and the reagent are always in contact with the solution while the reagent is loaded on the device. In the replacement performed by the user, a series of operations are performed until the dedicated suction nozzles are arranged in the reagent containers.

Since these reagents have different components, when different reagents come into contact with the suction nozzle due to a mistake made by the user during replacing the reagent container, or when the reagents scatter during the replacement and contamination between the reagents occurs, there are problems that a correct measurement result cannot be obtained, a consumable reagent becomes unusable, and a reagent flow path of the device needs to be rewashed. In particular, the reference electrode solution is preferably an aqueous solution having a concentration higher than that of the dilute solution or the standard solution in view of stability of the analysis by the ion selective electrode, so that methods for preventing the contamination with other reagents are essential.

PTL 1 discloses a specimen analyzing device having, as the method for preventing the contamination, a function of notifying the user a reagent that is a wrong reagent, a reagent whose remaining amount is insufficient, or a reagent that is expired by attaching an information storage unit such as a radio frequency identifier (RFID) to a reagent container and providing, in the analyzing device, an information reading unit that reads information in the information storage unit. Further, in PTL 1, a cover is provided on a container setting unit for setting a reagent container, and a locking mechanism for permitting and prohibiting closing of the cover and a control unit thereof are provided to prevent misplacement performed by a user.

In a dispensing device that dispenses and ejects a sample in PTL 2, in order to prevent the sample from scattering laterally from a tip end of a nozzle, a shutter that operates in conjunction with the nozzle is provided. The shutter is formed with a recess into which the tip end of the nozzle can be inserted. The sample is prevented from scattering from the tip end of the nozzle by inserting the tip end of the nozzle into the recess of the shutter and surrounding the tip end when the sample is not suctioned or ejected.

CITATION LIST

Patent Literature

PTL 1: JP-A-2011-209207
PTL 2: JP-A-9-211007

SUMMARY OF INVENTION

Technical Problem

In the specimen analyzing device disclosed in PTL 1, electronic power needs to be supplied to the specimen analysis apparatus to prevent misplacement. In the configuration in PTL 1, by applying an electric current to a solenoid of the reagent container setting unit, the cover of the reagent container setting unit is controlled to be locked in a closed state or an open state to prevent misplacement of the reagent container. On the other hand, when the electric current is not applied to the solenoid, the cover of the reagent container setting unit is unlocked. Therefore, when the specimen analysis apparatus is not powered on, the user can open and close the cover of the reagent container setting unit to perform the replacement of the reagent container without the lock control of the cover performed by the control unit.

If the reagent container can be replaced during a period when the analyzing device is not in operation, there is an advantage that it is not necessary to interrupt the measurement and an operation rate of the analyzing device can be increased. On the other hand, even the analyzing device manages reagent information with the RFID, when the device is not powered on, each mechanism cannot be controlled. Therefore, when the suction nozzle comes in contact with a different reagent due to a human error or the like, the above contamination risk occurs. Therefore, instead of completely disabling the reagent replacement when the analyzing device is not powered on, it is desirable that a part of the replacement, specifically, operations until the suction nozzle is brought into contact with the reagent are allowed even when the device is not powered on.

In the case of the dispensing nozzle disclosed in PTL 2, it is necessary to strictly manage a contamination risk. On the other hand, in a case of a nozzle for suctioning the reagent according to a present embodiment, the contamination risk differs depending on a type of the reagent. In the case of the electrolyte analyzing device according to the present embodiment, influence on a measurement result due to mixing a small amount of the reagent, which is accompanied by the scattering from the nozzle, differs depending on the reagent. Specifically, as mentioned above, the reference electrode solution having a higher concentration has a huge influence on the measurement results due to being mixed with other reagents, so that it is necessary to more strictly manage the contamination risk. On the other hand, a contamination risk of the dilute solution and internal standard solution that have relatively low concentrations is low. For this reason, it is desirable to configure reagent container setting as a simple mechanism corresponding to the contamination risk.

The present invention has been made in view of the above circumstances, and provided is an electrolyte analyzing device that prevents contamination caused by different reagents coming into contact with a suction nozzle when reagent replacement is performed by a user.

Solution to Problem

An electrolyte analyzing device according to an aspect of an embodiment of the invention is an electrolyte analyzing device which measures a liquid junction potential between a sample solution obtained by diluting a sample with a dilute solution and a reference electrode solution, or a liquid junction potential between an internal standard solution and the reference electrode solution. The electrolyte analyzing device includes a reagent container setting unit that sets a dilute solution bottle which houses the dilute solution, an internal standard solution bottle which houses the internal standard solution, and a reference electrode solution bottle which houses the reference electrode solution. In the electrolyte analyzing device, the reagent container setting unit includes a partition wall between the dilute solution bottle and the internal standard solution bottle, and the reference electrode solution bottle when the dilute solution bottle, the internal standard solution bottle, and the reference electrode solution bottle are set.

Other technical problems and novel characteristics will be apparent from a description of the description and the accompanying drawings.

Advantageous Effect

Even when the reagent container is replaced during a power of the device being cut off, contamination can be prevented.

BRIEF DESCRIPTION OF DRAWINGS

FIG. 1 shows an overall schematic diagram of an electrolyte analyzing device.

FIG. 2 illustrates an appearance of the electrolyte analyzing device (schematic view).

FIGS. 3(a), 3(b) and 3(c) illustrate states of a reagent container setting unit when a reagent container is replaced.

FIG. 4 illustrates a first configuration example of the reagent container setting unit.

FIG. 5A illustrates a state in which a nozzle support part is locked by a locking mechanism.

FIG. 5B illustrates a state in which the nozzle support part is unlocked by an unlocking mechanism.

FIGS. 6(a), 6(b) and 6(c) show configuration examples of the locking mechanism and the unlocking mechanism.

FIG. 7A shows an example of a reagent container replacement flow in a device power-on state.

FIG. 7B shows an example of a reagent container replacement flow in a device power-cutoff state.

FIG. 8 illustrates a second configuration example of a reagent container setting unit.

FIG. 9A illustrates a third configuration example of a reagent container setting unit (plan view).

FIG. 9B illustrates the third configuration example of the reagent container setting unit (side view).

FIG. 10 illustrates a fourth configuration example of a reagent container setting unit (top view).

FIG. 11 illustrates a configuration example of a nozzle support part in the fourth configuration example of the reagent container setting unit.

DESCRIPTION OF EMBODIMENTS

FIG. 1 shows an overall schematic diagram of an electrolyte analyzing device. The electrolyte analyzing device is not limited to a device alone, and may be mounted on an automatic analyzing device. Examples of the automatic analyzing device include a biochemical automatic analyzing device, an immunological automatic analyzing device, and the like. Alternatively, the electrolyte analyzing device may be mounted on a mass spectrometer used for clinical examination or a coagulation analyzing device that measures blood coagulation time, may be mounted on a combined system of the mass spectrometer, the coagulation analyzing device, the biochemical automatic analyzing device and the immunological automatic analyzing device, or may be mounted on an automatic analysis system applying these analyzing devices.

The electrolyte analyzing device shown in FIG. 1 is a flow-type electrolyte analyzing device using an ion selective electrode (hereinafter referred to as ISE electrode). FIG. 1 shows five mechanisms including a sample dispensing part, an ISE electrode unit, a reagent part, a mechanism part, and a waste solution mechanism as main mechanisms of the electrolyte analyzing device, and a control device that controls these mechanisms and that calculates and displays an electrolyte concentration based on a measurement result.

The sample dispensing part includes a sample probe 14. The sample probe 14 dispenses a sample such as a patient specimen held in a sample container 15 and transmits the sample into the analyzing device. Here, the specimen is a general term for analysis targets collected from a living body of a patient, and is, for example, blood or urine. An analysis target obtained by performing a predetermined pretreatment on blood, urine, or the like is also referred to as a specimen.

The ISE electrode unit includes a dilution tank 11, a sipper nozzle 13, a dilute solution nozzle 24, an internal standard solution nozzle 25, an ISE electrode 1, a reference electrode 2, a pinch valve 23, a voltmeter 27, and an amplifier 28. The sample dispensed by the sample dispensing part is discharged to the dilution tank 11, and is diluted and stirred with a dilute solution discharged from the dilute solution nozzle 24 into the dilution tank 11. The sipper nozzle 13 is connected to the ISE electrode 1 by a flow path, and the diluted sample solution suctioned from the dilution tank 11 is sent to the ISE electrode 1 through the flow path. On the other hand, a reference electrode solution housed in a reference electrode solution bottle 5 is sent to the reference electrode 2 by operating a sipper syringe 10 in a state where the pinch valve 23 is closed. When the diluted sample solution sent to the ISE electrode through the flow path and the reference electrode solution sent to the reference electrode through the flow path come into contact with each other, the ISE electrode 1 and the reference electrode 2 are electrically conducted. The ISE electrode unit measures a concentration of a specific electrolyte contained in the sample based on a potential difference between the ISE electrode 1 and the reference electrode 2.

Specifically, the ISE electrode 1 is attached with an ion sensitive membrane having a property that a electromotive force changes according to a concentration of a specific ion (for example, sodium ion ($Na^+$), potassium ion ($K^+$), chlorate ion ($Cl^-$), and the like) in a sample solution, and the ISE electrode 1 outputs an electromotive force according to a concentration of each ion in the sample solution, so that the voltmeter 27 and the amplifier 28 acquire the electromotive force between the ISE electrode 1 and the reference electrode 2. The control device 29 calculates the concentration of the ion in the sample based on the acquired electromotive force for each ion, and displays the concentration. The sample solution remaining in the dilution tank 11 is discharged by the waste solution mechanism.

The potential difference between the ISE electrode 1 and the reference electrode 2 is influenced by a temperature change and the like. In order to correct a potential change due to the influence of such temperature change and the like, in a period from one sample measurement being finished to a next sample measurement, an internal standard solution is discharged from the internal standard solution nozzle 25 into the dilution tank 11, and the measurement is performed in the same manner as in the case of the above sample (however, dilution for the internal standard solution is not performed). It is preferable to make a correction according to a change amount using a measurement result of the internal standard solution performed between the sample measurements.

The reagent part includes a suction nozzle 6 that suctions a reagent from a reagent container, a degassing mechanism 7, and a filter 16, and supplies a reagent necessary for measurement. When the electrolyte measurement is performed, three types of reagents, which are the internal standard solution, the dilute solution, and the reference electrode solution, are used as the reagent, and an internal standard solution bottle 3 in which the internal standard solution is housed, a dilute solution bottle 4 in which the dilute solution is housed, and a reference electrode solution bottle 5 in which the reference electrode solution is housed are set in the reagent part. FIG. 1 shows this state. A cleaning solution bottle that stores a cleaning solution when the device is cleaned is set in the reagent part.

The internal standard solution bottle 3 and the diluting solution bottle 4 are respectively connected to the internal standard solution nozzle 25 and the dilute solution nozzle 24 through the flow path via the filter 16, and each nozzle is provided in the dilution tank 11 with a tip end of the nozzle introduced therein. The reference electrode solution bottle 5 is connected to the reference electrode 2 through the flow path via the filter 16. Each degassing mechanism 7 is connected to a respective one of the flow path between the dilute solution bottle 4 and the dilution tank 11, and the flow path between the reference electrode solution bottle 5 and the reference electrode 2. A degassed reagent is supplied into the dilution tank 11 and the reference electrode 2. Accordingly, a negative pressure is applied to the flow path by a syringe to suction up the reagent from the bottle, so that a gas dissolved in the reagent appears as bubbles in the reagent. A degassing mechanism is provided, so that the reagent is not supplied to the dilution tank 11 or the reference electrode 2 with bubbles contained therein.

The mechanism part includes an internal standard solution syringe 8, a dilute solution syringe 9, a sipper syringe 10, electromagnetic valves 17, 18, 19, 20, 21, 22, 30, and a preheat 12, and feeds liquid within each mechanism or between the mechanisms and the like. For example, the internal standard solution and the dilute solution are sent to the dilution tank 11 by respective operations of the internal standard solution syringe 8 and the dilute solution syringe 9 and operations of the electromagnetic valves provided in the flow path. The preheat 12 reduces the influence of the temperature on the ISE electrode 1 by controlling temperatures of the internal standard solution and the dilute solution reaching the ISE electrode 1 within a certain range.

The waste solution mechanism includes a first waste solution nozzle 26, a second waste solution nozzle 36, a vacuum bottle 34, a waste solution receiver 35, a vacuum pump 33, and electromagnetic valves 31, 32, and discharges the sample solution remaining in the dilution tank 11 and a reaction solution remaining in the flow path of the ISE electrode unit.

Electrolyte concentration measuring operations performed by an electrolyte measuring device shown in FIG. 1 will be described. The measuring operations are controlled by the control device 29.

First, the sample dispensed from the sample container 15 by the sample probe 14 of the sample dispensing part is discharged to the dilution tank 11 of the ISE electrode unit. After the sample is dispensed into the dilution tank 11, the dilute solution nozzle 24 discharges the dilute solution from the dilute solution bottle 4 by an operation of the dilute solution syringe 9 to dilute the sample. As described above, in order to prevent bubbles from being generated due to changes in the temperature and pressure of the dilute solution in the flow path, the degassing mechanism 7 attached in a middle of the dilute solution flow path performs a degassing process. The diluted sample solution is suctioned into the ISE electrode 1 by operations of the sipper syringe 10 and the electromagnetic valve 22.

On the other hand, the pinch valve 23 and the sipper syringe 10 send the reference electrode solution into the reference electrode 2 from the reference electrode solution bottle 5. The reference electrode solution is, for example, a potassium chloride (KCl) aqueous solution having a predetermined concentration, and when the sample solution and the reference electrode solution are in contact with each other, the ISE electrode 1 and the reference electrode 2 are electrically conducted to each other. An electrolyte concentration of the reference electrode solution is preferably high so as to reduce the influence of the concentration change during the sending of the sample, but it is desirable that the concentration is between 0.5 mmol/L and 3.0 mmol/L since the solution may crystallize and cause clogging of the flow path when the concentration is near a saturation concentration. An ISE electrode potential with reference to a reference electrode potential is measured using the voltmeter 27 and the amplifier 28.

The internal standard solution of the internal standard solution bottle 3 set in the reagent part before and after the sample measurement is discharged to the dilution tank 11 by the internal standard solution syringe 8, and an electrolyte concentration of the internal standard solution is measured in the same manner as the sample measurement.

Using the ISE electrode potential measured for the sample solution, the control device 29 executes calculation to calculate the electrolyte concentration in the sample. At this time, by executing calibration based on the ISE electrode potential measured for the internal standard solution, the electrolyte concentration can be more accurately measured.

The control device can be configured as a computer including a central processing unit (CPU), a random access memory (RAM), a storage device, and an I/O port, and the RAM, the storage device, and the I/O port can exchange data with the CPU via an internal bus. The I/O port is connected to the above mechanisms to control operations thereof. The operations are controlled by reading the program stored in the storage device into the RAM and the CPU executing the program. An input/output device is connected to the control device 29, so that an input from a user and display of a measurement result can be executed.

Next, a reagent container setting unit of the electrolyte analyzing device according to the embodiment will be described. FIG. 2 illustrates an appearance (schematic view) of the electrolyte analyzing device. A reagent container setting unit 502 in which the internal standard solution bottle 3, the dilute solution bottle 4, and the reference electrode solution bottle 5 are set can be drawn out from an opening 503 using a rail 501 with respect to a housing 500 of the device. The opening 503 is normally closed by a door (not shown), and when reagent container replacement is performed, the door is opened to replace the reagent container. When the reagent container replacement is performed, as shown in FIG. 2 (right diagram), the user can easily replace the reagent container by drawing the reagent container setting unit 502 out of the housing 500. After the reagent container replacement is performed, the reagent container setting unit 502 is stored again in the housing 500 (FIG. 2 (left diagram)).

FIGS. 3(a), 3(b) and 3(c) illustrate states of the reagent container setting unit when the reagent container is replaced. All cases in which (a) the reagent container setting unit 502 is stored, (b) the reagent container setting unit 502 is drawn, and (c) the reagent container is replaced are shown as perspective views from a side surface of the housing 500. Hereinafter, a configuration example of the reagent container setting unit 502 will be described.

First Embodiment

FIG. 4 illustrates a first configuration example of the reagent container setting unit 502. The figure illustrates a cross-sectional view (schematic diagram) of a state in which the suction nozzle 6 of the reagent container setting unit 502 is inserted into a reagent container 101. In the reagent container setting unit 502, a reagent container stand 204 is provided on a substrate 205. By placing the reagent container 101 on the substrate 205 and coupling the substrate 205 to the rail 501 (not shown), the reagent container setting unit 502 can be taken in and out of the housing of the device. The suction nozzle 6 is coupled to a handle 202 and a nozzle support part 203 that can be moved up and down from the reagent container stand 204. A power supply device 303 is connected to the reagent container setting unit 502, and as described later, electric power is supplied to an unlocking mechanism 302, a RFID reader/writer 103, and a container detector 104, which require the electric power for operations thereof. When the analyzing device is powered on, the power supply device 303 supplies electric power to the reagent container setting unit 502, and when the analyzing device is powered off, the power supply device 303 does not supply electric power to the reagent container setting unit 502. The figure shows a state in which the nozzle support part 203 is housed in the reagent container stand 204.

FIG. 5A illustrates a state in which the nozzle support part 203 is locked by a locking mechanism 301. When the reagent container 101 is replaced by the user, the user manually lifts up the handle 202, so that the suction nozzle 6 can be detached from the reagent container 101 without touching the suction nozzle 6. When the nozzle support part 203 is lifted to an upper limit point, the locking mechanism 301 holds the nozzle support part 203 at a position shown in FIG. 5A. This position is referred to as a reagent container replacement position. Accordingly, the user can let go of the handle 202 to replace the reagent container 101.

The suction nozzle 6 is preferably configured with a fixed metal pipe, so that a nozzle tip end position does not shift from a placing position of the reagent container 101 when the user lifts up the handle 202. Accordingly, it is possible to prevent the reagent from scattering around due to a shake of a suction nozzle tip end 6a associated with the operation. The shake is supposed to happen when the suction nozzle 6 is a flexible resin pipe. On the other hand, an end portion 6b of the suction nozzle 6 on a handle side is connected to a pipe (not shown) to connect the suction nozzle 6 to the flow path of the device. Using a flexible resin pipe as the pipe connected to the suction nozzle end portion 6b, the reagent container setting unit 502 can be easily moved in and out of the housing, and the nozzle support part 203 can be easily moved up and down.

It is preferable that in the state in which the nozzle support part 203 is locked by the locking mechanism 301, there is a predetermined distance ε between the suction nozzle tip end 6a and a reagent suction port 110 of the reagent container 101. Accordingly, when the user replaces the reagent container 101, the user does not need to hit the reagent container 101 with the suction nozzle tip end 6a or to tilt the reagent container and place the reagent container on the reagent container setting unit, so that it is possible to reduce risks of a spillage of the reagent from the reagent container 101, scattering of the reagent from the suction nozzle tip end 6a, and the like during replacement.

FIG. 5B illustrates a state in which the nozzle support part 203 is unlocked by an unlocking mechanism 302 from the state shown in FIG. 5A. The locking mechanism 301 is unlocked by the unlocking mechanism 302 under control of the control device 29 in a state in which electric power is supplied from the power supply device 303 to the unlocking mechanism 302. At this time, it is desirable that the nozzle support part 203 is provided with a damper mechanism, so that the suction nozzle 6 and the nozzle support part 203 slowly descend even when the user does not grip the handle 202. In the present example, the nozzle support part 203 is stopped when the nozzle support part 203 is fully descended, and a position thereof is referred to as a reagent suction position.

FIGS. 6(a), 6(b) and 6(c) show configuration examples of the locking mechanism 301 and the unlocking mechanism 302. The locking mechanism 301 includes a base on fixed side 601 and a base on movable side 602, and a spring 604 is provided between the base on fixed side 601 and the base on movable side 602. A bearing 603 is connected to a surface that faces a surface of the base on movable side 602 on which the spring 604 is provided. The unlocking mechanism 302 includes a solenoid 611, and the solenoid 611 is connected to the base on movable side 602.

FIG. 6(a) shows that the reagent container setting unit 502 in normal conditions is in the state shown in FIG. 4. In the normal conditions, the solenoid 611 is off, and the bearing 603 is in contact with a guide part 203a of the nozzle support part 203. At this time, since the spring 604 is compressed, the bearing 603 is pressed against the guide part 203a by an elastic force of the spring 604.

FIG. 6(b) shows that the reagent container setting unit 502 being locked is in the state shown in FIG. 5A. Even when the reagent container setting unit 502 is locked, the solenoid 611 is off. When the nozzle support part 203 is lifted in a direction 621, the bearing 603 is fitted with a lock recess part 203b provided in the nozzle support part 203. Accordingly, the nozzle support part 203 is locked, so that the nozzle support part 203 does not descend even when the user releases the handle. At this time, a length of the spring 604 is close to a natural length.

In this way, using the elastic force of the spring regardless of whether or not the device is powered on, the suction nozzle 6 can be drawn out from the reagent container 101 by lifting the nozzle support part 203, and the nozzle support part 203 can be locked in that state. Not only the spring but also an elastic body can be used, and the nozzle support part 203 may be locked by another mechanical operation as long as electric power is not required for the operation thereof.

FIG. 6(c) shows that the reagent container setting unit 502 being unlocked is in the state shown in FIG. 5B. The solenoid 611 is turned on, the bearing 603 and the base on movable side 602 are attracted in a direction 622. Accordingly, the bearing 603 is pulled out from the lock recess part 203b, and the nozzle support part 203 descends in a direction 623. After a predetermined time, the solenoid 611 is turned off, and the bearing 603 comes into contact with the guide part 203a of the nozzle support part 203. When the nozzle support part 203 is fully descended, the reagent container setting unit 502 returns to the normal conditions.

In order to operate the solenoid 611, electric power is supplied to the solenoid 611, and the control device 29 needs to control the solenoid 611 to turn on the solenoid 611. Accordingly, in order to unlock the nozzle support part 203 and insert the suction nozzle 6 into the reagent container, it is necessary to supply electric power of the device. As long as the unlocking operation is controlled by the control device 29, the unlocking mechanism 302 may unlock the nozzle support part 203 by another operation. For example, the nozzle support part 203 may be unlocked by pneumatic pressure that exceeds the elastic force of the spring.

Further, the reagent container 101 is provided with an RFID tag 102 on which information related to the reagent, such as a type of the reagent, an amount of remaining solution, an expiration date, and a lot number, is stored (see FIG. 4). In order to exchange information with the RFID tag 102, the reagent container stand 204 is provided with the RFID reader/writer 103 at a position facing the reagent container 101 that is placed on the reagent container stand 204. A container detector 104 detecting that the reagent container 101 is placed at a reagent container placing position is provided. The container detector 104 includes, for example, a light source that emits infrared light and a photodetector that detects the infrared light. Presence or absence of the reagent container 101 is determined by the photodetector detecting presence or absence of the reflected light from the reagent container 101. The RFID tag and the RFID reader/writer are examples, and it is sufficient that an information storage medium in which information related to the reagents to be stored is stored is attached to the reagent container, and an information reader provided in the reagent container setting unit can read the information related to the reagents to be stored and stored in the information storage medium.

Next, a flow of replacing the reagent container will be described. As described above, in the reagent container setting unit 502 according to the present embodiment, an original reagent container can be taken out and a new reagent container can be provided regardless of whether or not electric power of the device is supplied. On the other hand, the suction nozzle can be inserted into the new reagent container only when the electric power of the device is supplied. FIG. 7A shows an example of a reagent container replacement flow in a device power-on state, and FIG. 7B shows an example of a reagent container replacement flow in a device power-cutoff state.

Firstly, a reagent container replacement flow (FIG. 7A) in the device power-on state will be described. As described above, the user grips the handle 202 and lifts the nozzle support part 203 (S702), and takes out the reagent container 101 (S704) in a state in which the nozzle support part 203 is locked (S703). Accordingly, reagent container detection performed by the container detector 104 is turned off (S705). When a new reagent container 101 is placed on the reagent container setting unit 502 by the user again (S706), the container detector 104 detects the new reagent container 101 (S707). The RFID reader/writer 103 starts reading RFID information of the reagent container 101, which is triggered by the detection of the reagent container performed by the container detector 104. The control device 29 determines whether or not the reagent contained in the reagent container is normal based on the RFID information (S708). Examples of specific determination contents include whether or not a type of reagent is a reagent that is to be placed in a place where the reagent is originally placed, whether or not enough solution remains, and whether or not the reagent expires. When the RFID information is normal, the control device 29 registers the read RFID information (S709) and causes the unlocking mechanism 302 to unlock the locking mechanism 301 (S710). The nozzle support part 203 automatically descends when the lock is released, and the suction nozzle 6 moves to a predetermined suction position in the reagent container 101. On the other hand, when the RFID information is not normal, this fact is displayed on a display unit of the control device 29. Accordingly, the user can replace the suction nozzle 6 with a correct reagent container before bringing the suction nozzle 6 into contact with a wrong reagent (S704 to S706). In this way, since the suction nozzle 6 contacts the normal reagent only, contamination due to misplacement of the reagent container performed by the user can be prevented.

Next, a reagent container replacement flow (FIG. 7B) in the device power-cutoff state will be described. Steps having the same contents as those in the replacement flow in FIG. 7A are designated by the same reference numerals. The user grips the handle 202 and lifts the nozzle support part 203 (S702), and replaces the reagent container 101 (S704, S706) in a state in which the nozzle support part 203 is locked (S703). As described above, the locking mechanism 301 according to the present embodiment can mechanically lock the nozzle support part 203 without being supplied with electric power. When the device power is turned on by the user (S721), the device checks a state of the container detector 104 of the reagent container setting unit 502 as one of initialization processes (S722), and when the container detector 104 detects the reagent container 101, the RFID information is checked using the detection as a trigger (S708). When the RFID information is normal, the control device 29 registers the read RFID information (S709) and causes the unlocking mechanism 302 to unlock the locking mechanism 301 (S710). On the other hand, when the reagent container is not detected, or when the RFID information is not normal, this fact is displayed on the display unit of the control device 29 as a failed replacement (S724). In this case, since the device power is already turned on, the process proceeds to step S704 or S705 in FIG. 7A to execute the reagent replacement process. If the replacement terminates normally (S723), then if necessary, the control device 29 automatically executes a solution replacement operation in the flow path and an analysis preparation operation.

Generally, in the electrolyte analyzing device, in initial processing after electric power is turned on, the electrolyte analyzing device has a function of automatically executing an operation of sending the solutions into the flow path, an operation of checking the device status, a washing operation, and the like, and a function of allowing a transition to an analysis operation in a short time. However, when it is recognized that a remaining amount of the reagent is not sufficient after the initial processing and the reagent container is replaced, the solution replacement operation in the flow path and the like is required again, which results in that a time is required to start the analysis. According to the present embodiment, the user can perform the reagent replacement while maintaining effect of preventing the contamination between the reagents even when the device power is cut off, and can use the device without additional operations after electric power is supplied.

Further, the reagent container 101 is a container made of a transparent or translucent material. As long as the reagent container setting unit 502 is easily visible to the user, it is convenient that the user can visually check the remaining amount of the reagent and can replace the reagent in advance if necessary before turning on the power supply of the device.

Second Embodiment

FIG. 8 illustrates a second configuration example of the reagent container setting unit 502. A main difference in the second configuration example from the first configuration example is that two suction nozzles 6-1, 2 are coupled to the nozzle support part 203, and the two suction nozzles 6-1, 2 can be simultaneously lifted by lifting the handle 202 by the user. Although omitted in FIG. 8, the container detector 104 and the RFID reader/writer 103 shown in FIG. 4 are provided respectively corresponding to reagent containers 101-1, 2. A reagent container replacement flow is also similar to those shown in FIGS. 7A and 7B. When one or more reagent containers are replaced by the user and RFID information of all reagent containers is normal, the unlocking mechanism 302 unlocks the nozzle support part 203, so that the suction nozzles 6-1, 2 respectively move to predetermined suction positions in the reagent containers 101-1, 2. FIG. 8 shows an example of two reagent containers, but three or more reagent containers may be used.

According to this configuration, the user can simultaneously perform required reagent container replacement with a single lifting/descending operation of the nozzle support part 203, thus improving efficiency of the replacement. In the analyzing device that can store a plurality of reagent containers of the same reagent in the reagent container setting unit 502 and can switch and use other reagent containers when the remaining amount of the reagent in one reagent container becomes small, even when a normal reagent is not placed at all positions, an unlocking condition may be a condition that at least the reagents necessary for analysis are normally placed one by one. The unlocking condition is that the necessary reagents are correctly placed and no abnormal reagent is placed, so that the suction nozzle 6 can be prevented from coming into contact with an inappropriate reagent.

Third Embodiment

As shown in FIG. 8, with the configuration in which a plurality of reagent containers are arranged side by side in the reagent container setting unit 502, the reagent container setting unit can be made compact, and the efficiency of the replacement can be improved as described in a second embodiment. Since in the electrolyte analyzing device as shown in FIG. 1, three reagents including the internal standard solution, the dilute solution, and the reference electrode solution are used, a configuration of the reagent container setting unit 502 in which these three reagent containers are placed will be examined as a third embodiment. Since the reagent container is replaced manually, it is not possible to eliminate a risk of contamination occurring due to reagent scattering from the suction nozzle, solution spilling from the suction port of the reagent container, or the like during the replacement. In particular, when a plurality of reagent containers are placed side by side in close proximity to one another, an operation error of the user easily causes the contamination. However, in the case of the reagent in the electrolyte analyzing device and in the case of the internal standard solution and the dilute solution, even when some reagents scatter, influence thereof can be ignored in most cases. On the other hand, since the reference electrode solution contains ions at a higher concentration than the internal standard solution and the dilute solution, it is necessary to more strictly manage the risk of contamination.

FIGS. 9A and 9B are configuration examples (third configuration example) of the reagent container setting unit 502 on which three reagent containers are placed, and in particular, are configurations suitable for an electrolyte analyzing device that uses two reagents having a relatively low concentration and one reagent having a relatively high concentration. FIG. 9A is a plan view, and FIG. 9B is a side view when seen from an arrow direction shown in FIG. 9A. Display of the handle 202 is omitted in FIG. 9A.

In this configuration, three types of reagent containers of a dilute solution and a standard solution that have a relatively low concentration and a reference electrode solution that has a relatively high concentration can be placed, so that the risk of contamination is reduced. Specifically, a dilute solution bottle and an internal standard solution bottle are placed as juxtaposed reagent containers 101-1, 101-2, and a reference electrode solution bottle is placed as a reagent container 101-3 at a position separated from the containers 101-1, 101-2 by the reagent container stand 204. Therefore, when three reagent containers are placed on the reagent container setting unit shown in FIGS. 9A and 9B, the reagent container stand 204 is interposed between the reagent suction port 110 of the dilute solution bottle or the reagent suction port 110 of the internal standard solution bottle and the reagent suction port 110 of the reference electrode solution bottle. The state in which the handle 202 is lifted up is the same as that in FIG. 5A, and in the state in which the nozzle support part 203 is locked, the reagent container stand 204 is interposed between the tip end of the suction nozzle 6 for the dilute solution or the tip end of the suction nozzle 6 for the internal standard solution and the tip end of the suction nozzle 6 for the reference electrode solution. Accordingly, even when reagent scattering from a tip end of a reference electrode solution suction nozzle 6-3, solution spilling from a reagent suction port of the reagent container (reference electrode solution bottle) 101-3, or the like occurs during the replacement, the reagent container stand 204 is severed as a partition wall, and can reduce a risk of mixing reagents from the reference electrode solution bottle into other reagent containers to a low level. Further, when the nozzle support part 203 has a plate shape as shown in FIG. 8, since the reagent container is replaced in a state in which the nozzle support part 203 is lifted up, the nozzle support part 203 also can serve as the partition wall.

In addition, as an additional effect of changing a setting direction of the reagent container only for the reference electrode solution, for example, when the user replaces all three types of reagent containers, the dilute solution bottle and the standard solution bottle that are placed side by side can be easily taken out with both hands at the same time. Thus, efficient operations can be performed with these reagents having a low contamination risk. On the other hand, the reference electrode solution bottle having a high contamination risk is arranged to prompt replacement of only this reagent container. By shifting a replacement timing of the reagent container having high contamination risk from a replacement timing of other reagent containers, the risk of the contamination due to the scattering of the reagent during the replacement of the reagent container can be reduced.

A shape of the reagent container 101 can be regarded as a rectangular parallelepiped shape having a rectangular upper surface (chamfering or unevenness on the reagent container is not hindered), so that the reagent suction port 110 of the reagent container 101 is arranged at a position closer to a short side than a center position of an upper surface. Accordingly, a distance from the nozzle support part 203 to the reagent suction port 110 can be kept short even when the reagent containers are arranged in a longitudinal direction as shown in FIGS. 8 and 9A. In order to utilize that the reagent suction port 110 is close to an end portion (short side) and make it easier for the user to hold the reagent container, it is also desirable to provide a handle for the reagent container in an empty space on the upper surface of the container.

In the reagent container setting unit shown in FIGS. 9A and 9B, the plurality of reagent containers 101-1, 2 arranged side by side and the reagent container 101-3, which is separated from the reagent containers 101-1, 2 by the reagent container stand 204, are placed in different directions. That is, the reagent containers 101-1, 2 are provided so that each of the short sides of the upper surfaces thereof faces one predetermined surface of the reagent container stand, and the reagent container 101-3 is placed so that a long side of the upper surface thereof faces a back surface of the one predetermined surface of the reagent container stand. Accordingly, the reagent container setting unit can be made compact as a whole, and as shown in FIG. 9A, the reagent suction ports 110-1 to 110-3 of the respective reagent containers 101-1 to 101-3 can be arranged at the same distance from a center of the nozzle support part 203. In this case, for example, as compared with an arrangement layout in which three reagent containers are juxtaposed in a same direction, effect that the lengths (lengths between the tip end of the suction nozzle that is inserted into the reagent container and the end portion of the suction nozzle that is connected to the pipe that forms the flow path) of the suction nozzles of each reagent can be made uniform, and effect that a movable (flexible) flow path portion connected to the suction nozzle 6 can be centralized in one place are obtained.

In the configurations in FIGS. 9A and 9B, similarly to the configuration in FIG. 8, it is desirable to control the unlocking condition, so that unlocking is performed only when all necessary reagents are prepared. For example, an LED indicator light may be provided near the placing position of the reagent container in the reagent container setting unit, and the user may be notified by turning on/blinking/turning off the LED of the reagent container that needs to be replaced.

As reagents that can be stored in the reagent container increase, more of the number of times of replacement of the reagent container can be reduced, which is efficient. Therefore, it is desirable that a height of the reagent container is as large as possible in accordance with heights of the reagent container setting unit 502 and the opening 503 of the housing 500 (see FIG. 3). Alternatively, it is desirable to make the heights of the reagent container setting unit 502 and the opening 503 of the housing 500 as small as possible according to the height of the reagent container so as to make the device compact. Here, in the reagent container setting unit 502, if the state in which the nozzle support part 203 is locked is the state in FIG. 5A and the height of the reagent container 101 is higher than that in the state in FIG. 5A, the reagent container 101 and the suction nozzle tip end 6a are likely to come into contact with each other, or the reagent container 101 needs to be tilted and placed at the placing position during the replacement of the reagent container, which increases the risk of the contamination. FIG. 10 shows a fourth configuration example (bird's-eye view) of the reagent container setting unit 502 that solves such a problem. FIG. 10 shows a state in which nozzle support parts (801, 811) are drawn out from the reagent container stand 204 and locked.

In the reagent container setting unit 502 shown in FIG. 10, when the reagent container 101 is placed on the substrate 205, an upper end of the reagent suction port 110 is slightly lower than an upper end of the reagent container stand 204. That is, it is assumed that a reagent container having a capacity as large as possible within a capacity of the reagent container setting unit 502 is placed. Even in such a case, in order to allow the predetermined distance ε between the suction nozzle tip end 6a and the upper end of the reagent suction port 110 of the reagent container 101 (see FIG. 5A), in the configuration in FIG. 10, the nozzle support part 203 includes a plurality of struts 801, 811. In addition, in the state in which the nozzle support part 203 is locked by the locking mechanism 301, when a position of the suction nozzle tip end 6a is near or above the upper end of the reagent container stand 204, the contamination may occur due to vibration of the suction nozzle tip end 6a. Therefore, among the plurality of struts (two in the figure) of the nozzle support part 203, a lower strut 811 has a plate shape and has a function of the shielding plate for reducing the occurrence of contamination. As shown in FIG. 10, in the state in which the nozzle support part 203 is locked, both a first line connecting a suction nozzle tip end 6a-1 and a suction nozzle tip end 6a-3, and a second line connecting a suction nozzle tip end 6a-2 and the suction nozzle tip end 6a-3 are in a state of being shielded by the lower strut (shielding plate) 811. Accordingly, even when the reagent scattering from the reference electrode solution suction nozzle 6-3, the solution spilling from the reagent suction port of the reagent container (reference electrode solution bottle) 101-3, or the like occurs during the reagent container replacement, the reagent container stand 204 and the lower strut (shielding plate) 811 serves as the partition wall, and the risk of mixing reagents from the reference electrode solution bottle into other reagent containers can be reduced to a low level.

All of the suction nozzle end portions 6b-1 to 6b-3 are set to come close to the center of the handle 202, and flexible resin pipes forming the flow paths are connected.

FIG. 11 illustrates a configuration example of the nozzle support part 203 applied to the reagent container setting unit 502 in FIG. 10. In FIG. 11, (a) illustrates a state in normal conditions, and (b) illustrates a locked state. The nozzle support part 203 includes an upper stage first strut 801 and a lower stage second strut (hereinafter referred to as a shielding plate) 811. The shielding plate 811 is provided with a pulley with damper function 814 on an upper side of the shielding plate 811 and a pulley 815 on a lower side of the shielding plate 811, and a belt 816 is hung between the pulley with damper function 814 and the pulley 815. The first strut 801 is connected to the belt 816 by a first belt holding unit 813a, and the reagent container stand 204 is connected to the belt 816 by a second belt holding unit 813b, so that the first strut 801 and the shielding plate 811 are interlockingly lifted up. The first belt holding unit 813a is engaged with a first linear guide 812a, and the second belt holding unit 813b is engaged with a second linear guide 812b, so that lifting and descending operations of the nozzle support part 203 can be stably performed. Regarding the damper function of the pulley with damper function 814, it is desirable that a torque is generated only when the pulley 814 descends. Accordingly, a load on the user can be reduced during a manual lifting operation.

By configuring the nozzle support part in this way, a movement stroke H of the nozzle support part 203 can be made larger than a height h of the reagent container setting unit 502 in the normal conditions. In this way, even when the height of the reagent container setting unit 502 is equivalent to that of the reagent container, the suction nozzle tip end can be sufficiently separated from the reagent container, and by giving at least the lower strut a function of the shielding plate, the occurrence of the contamination can be reduced.

REFERENCE SIGN LIST 1 ion selective electrode
2 reference electrode
3 internal standard solution bottle
4 dilute solution bottle
5 reference electrode solution bottle
6 suction nozzle
6a suction nozzle tip end
6b suction nozzle end portion
7 degassing mechanism
8 internal standard solution syringe
9 dilute solution syringe
10 sipper syringe
11 dilution tank
12 preheat
13 sipper nozzle
14 sample probe
15 sample container
16 filter
17, 18, 19, 20, 21, 22, 30, 31, 32 electromagnetic valve
23 pinch valve
24 dilute solution nozzle
25 internal standard solution nozzle
26 first waste solution nozzle
27 voltmeter
28 amplifier
29 control device
33 vacuum pump
34 vacuum bottle
35 waste solution receiver
101 reagent container
102 RFID tag
103 RFID reader-writer
104 container detector
110 reagent suction port
202 handle
203 nozzle support part
203a guide part
203b lock recess part
204 reagent container stand
205 substrate
301 locking mechanism
302 unlocking mechanism
303 power supply device
500 housing
501 rail
502 reagent container setting unit
503 opening
601 base on fixed side
602 base on movable side
603 bearing
604 spring
611 solenoid
621, 622, 623 direction
801 first strut
811 second strut (shielding plate)
812a, 812b linear guide
813a, 813b belt holding unit
814 pulley with damper function
815 pulley
816 belt

The invention claimed is:

1. An electrolyte analyzing device which measures a liquid junction potential between a sample solution obtained by diluting a sample with a dilute solution and a reference electrode solution, or a liquid junction potential between an internal standard solution and the reference electrode solution, the electrolyte analyzing device comprising:
a reagent container setting unit that sets a dilute solution bottle which houses the dilute solution;
an internal standard solution bottle which houses the internal standard solution; and
a reference electrode solution bottle which houses the reference electrode solution, wherein the reagent container setting unit comprises a partition wall between the dilute solution bottle and the internal standard solution bottle, and the reference electrode solution bottle when the dilute solution bottle, the internal standard solution bottle, and the reference electrode solution bottle are set, wherein the reagent container setting unit further comprises:
a substrate on which the dilute solution bottle, the internal standard solution bottle, and the reference electrode solution bottle are set;
a first suction nozzle that suctions the dilute solution from the dilute solution bottle;
a second suction nozzle that suctions the internal standard solution from the internal standard solution bottle;
a third suction nozzle that suctions the reference electrode solution from the reference electrode solution bottle;
a nozzle support part that is coupled to the first suction nozzle and to the third suction nozzle, wherein the nozzle support part is movable between a reagent container replacement position and a reagent suction position; and
a reagent container stand that houses the nozzle support part in a drawable manner through a handle, wherein when the dilute solution bottle, the internal standard solution bottle, and the reference electrode solution bottle are set on the substrate, wherein the dilute solution bottle comprises a first reagent suction port, the internal standard solution bottle comprises a second reagent suction port and the reference electrode bottle comprises a third reagent suction port, wherein the reagent container stand is interposed between the first reagent suction port and the third reagent suction port, or is interposed between the second reagent suction port and the third reagent suction port, wherein the nozzle support part has a plate shape, and the nozzle support part is drawn out from the reagent container stand, wherein nozzle support part comprises the partition wall.

2. The electrolyte analyzing device according to claim 1, wherein the nozzle support part has a plurality of struts, and a lower strut among the plurality of struts has a plate shape and is drawn out from the reagent container stand, wherein the lower strut comprises the partition wall.

3. The electrolyte analyzing device according to claim 2, wherein the first suction nozzle comprises a first tip end, the second suction nozzle comprises a second tip end and the third suction nozzle comprises a third tip end, wherein a line that connects the first tip end and the third tip end is blocked by the lower strut at the reagent container replacement position, and a line that connects the second tip end and the third tip end is blocked by the lower strut at the reagent container replacement position.

4. The electrolyte analyzing device according to claim 1, wherein a shape of at least one of the dilute solution bottle, the internal standard solution bottle, and the reference electrode solution bottle is a rectangular parallelepiped shape having a rectangular upper surface;
the dilute solution bottle and the internal standard solution bottle are set such that short sides of upper surfaces of the dilute solution bottle;
the internal standard solution bottle separately faces a predetermined surface of the reagent container stand; and
the reference electrode solution bottle is set such that a long side of an upper surface of the reference electrode solution bottle faces a back surface of the predetermined side of the reagent container stand.

5. The electrolyte analyzing device according to claim 4, wherein the first reagent suction port and the third reagent suction port are set on an upper surface on the short side facing the predetermined surface of the reagent container stand.

6. The electrolyte analyzing device according to claim 1, comprising: a housing, wherein in a state where the nozzle support part is at the reagent suction position, the reagent container setting unit is stored in the housing, and in a state where the reagent container setting unit is drawn out from the housing, the nozzle support part is movable from the reagent suction position to the reagent container replacement position.

7. The electrolyte analyzing device according to claim 1, wherein
an end part of the first suction nozzle is connected to a pipe that constitutes a flow path of the dilute solution,
an end part of the second suction nozzle is connected to a pipe that constitutes a flow path of the internal standard solution,
an end part of the third suction nozzle is connected to a pipe that constitutes a flow path of the reference electrode solution, and
a length between a tip end of the first suction nozzle inserted into the dilute solution bottle and the end part of the first suction nozzle, a length between a tip end of the second suction nozzle inserted into the internal standard solution bottle and the end part of the second suction nozzle, and a length between a tip end of the third suction nozzle inserted into the reference electrode solution bottle and the end part of the third suction nozzle are equal.

8. An electrolyte analyzing device which comprises a housing; and a regent container setting unit capable of being drawn out from the housing, wherein
the reagent container setting unit comprises:
a substrate on which a reagent container is set;
a first suction nozzle that suctions a reagent from a first reagent container;
a nozzle support part that is coupled to the first suction nozzle and is movable between a reagent container replacement position and a reagent suction position; and
a reagent container stand that houses the nozzle support part in a drawable manner through a handle, wherein
the nozzle support part comprises an upper strut and a lower strut that operate in conjunction with each other through a belt, a first belt holding unit, and a second belt-holding unit, so that the upper strut and the lower strut can be interlockingly lifted up, and a movement stroke of the nozzle support part is larger than a height of the reagent container setting part at the reagent suction position.

9. The electrolyte analyzing device according to claim 8, wherein the first suction nozzle comprises a tip end and the first reagent container comprises a first reagent suction port, wherein the tip end is disposed at a predetermined distance from the first reagent suction port at the reagent container replacement position, and the first suction nozzle can be inserted into the first reagent container at the reagent suction position.

10. The electrolyte analyzing device according to claim 8, further comprises:
a second suction nozzle wherein the second suction nozzle that suctions a reagent from a second reagent container, wherein the second suction nozzle is coupled to the nozzle support part;
the reagent container stand is disposed between a setting position of the first reagent container and a setting position of the second reagent container on the substrate; and
a height of the first reagent container and a height of the second container are each smaller than a height of the reagent container stand.

11. The electrolyte analyzing device according to claim 10, wherein the first suction nozzle comprises a first tip end and the second suction nozzle comprises a second tip end; and
the lower strut of the nozzle support part has a plate shape; and
a line that connects the first tip end and the second tip end is blocked by the lower strut at the reagent container replacement position.

12. The electrolyte analyzing device according to claim 11, wherein
a dilute solution or an internal standard solution is housed in the first reagent container, and a reference electrode solution is housed in the second reagent container.

13. The electrolyte analyzing device according to claim 8, wherein
the nozzle support part has a damper function of generating torque when the nozzle support part is lowered.

* * * * *